Feb. 4, 1958 J. J. ROBSON 2,822,141
TIRE BEAD CONSTRUCTION
Filed April 13, 1955 2 Sheets-Sheet 1

INVENTOR
JAMES J. ROBSON
BY
W. A. Fraser
ATTY-

Feb. 4, 1958　　　J. J. ROBSON　　　2,822,141
TIRE BEAD CONSTRUCTION
Filed April 13, 1955　　　2 Sheets-Sheet 2

INVENTOR
JAMES J. ROBSON
BY
W. A. Fraser
ATTY.

United States Patent Office 2,822,141
Patented Feb. 4, 1958

2,822,141

TIRE BEAD CONSTRUCTION

James J. Robson, Akron, Ohio, assignor to The Firestone Tire & Rubber Company, Akron, Ohio, a corporation of Ohio Application April 13, 1955, Serial No. 501,153

3 Claims. (Cl. 245—1.5)

This invention relates to an improvement in pneumatic straight side tire bead reinforcement and particularly to the construction and method of making the inextensible portion of such beads.

It is a common practice in the manufacture of pneumatic straight side tires to provide the bead portions of the tire with substantially inextensible wire grommets usually formed of high carbon steel. The wire forming said grommets may be fashioned into flat ribbons of braided wire which are run through a rubber insulating machine whereby a cover of rubber is formed about the wire. Another method of forming the grommets is to insulate a single wire by passing it through a rubber insulating machine and then to wind the insulated wire continuously on a building ring until a sufficient number of convolutions have been obtained to provide the tensile strength desired in each grommet.

The present invention is illustrated with grommets formed by passing a number of closely equally spaced parallel single wires in the same plane through a rubber insulating machine forming a coat of rubber about and between the wires thereby forming a flat ribbon. The ribbon is wound flat, upon iself, upon a building ring until the body, of the grommet, is built up to tensile strength required.

Tire engineers generally accept the desirability of avoiding, so far as practical, movement of the tire bead portions relative to the tire rim when the tire is run in service. The most common solution to avoid this undesirable movement is to provide the tire beads with enough wire, in the form of a grommet, to have sufficient tensile, to anchor the tire plies attached to the grommets and to build the tire with a minimum thickness of rubberized fabric and rubber radially inward from said grommets. It is also accepted by tire engineers as desirable to keep the wire of the bead low relative to the radial outer portion of the tire rim flange.

The increase in speed of acceleration and increased breaking power of automobiles has subjected the tire beads to an increased tendency to slip on their rims. To prevent such slippage tire designers have reduced the clearance between the tire beads and the tire rim until the tires of some large manufacturers now have a minus clearance between the radial inner surface of the tire beads and the rim. Other large manufacturers' tires have zero clearance. The tight fit of the tire beads to the rim is expected to become more desirable as the use of tubeless tires becomes general.

It has developed that in tires of the type now in common use that the grommet of wire used becomes ruptured or broken too frequently at or near the end of the wire splice when the tire bead is forced onto the rim bead seat during mounting of the tire. Applicant has discovered that such breaking of the bead wire occurs most frequently when the spliced portion of the bead wire grommet is located in the last portion of the tire bead to be seated on the rim, and they have also noted that when an end of the said wire ribbon was disposed on the radial inner surface of the bead grommet that the break started at or adjacent to that point.

It is an object of the present invention to provide a tire bead reinforcement formed of a plurality of parallel spaced rubber insulated wires, in the form of a ribbon wound into a grommet consisting of two or more convolutions of said ribbon, said ribbon being wound throughout substantially its length with the short axis of the ribbon parallel with the axis of the grommet and with the ends of said ribbon disposed on the radial outer surface of the grommet.

Another object of the invention is to provide tire bead grommets as set out in the object of the invention above but different in construction in that one end of the ribbon is disposed on the lateral side of the grommet.

A principle object of the present invention is to provide a rubber insulated wire bead grommet of a length of ribbon of such wire and rubber wound flat upon itself throughout substantially its entire length in such manner that neither end of the ribbon is disposed on the radial inner surface of the grommet.

A further object of the invention is to provide a simple method of constructing such wire grommets or annuli.

Other objects and advantages of the present invention will be manifest from the specifications and following description of the drawings herein:

Figure 1:
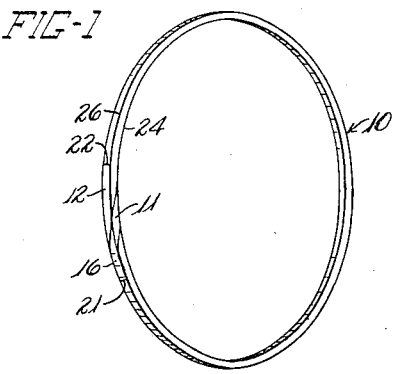
Fig. 1 is a view in perspective of a completed grommet or annulus of reinforcement embodying the present invention.
Figure 2:
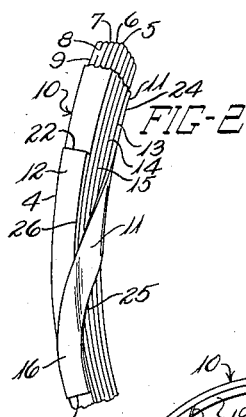
Fig. 2 is a fragmentary view of Fig. 1 drawn to larger scale and showing same with the rubber coating removed from the wire of a portion thereof.
Figure 8:
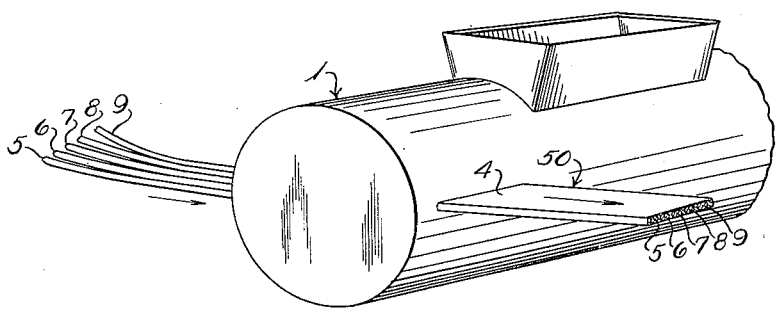
Fig. 8 is a diagrammatical view illustrating a plurality of bead wires passing through a wire insulating machine and emerging covered with rubber in ribbon form.

Referring to the drawings in detail, it will be seen by reference to Figs. 1 and 2 that a grommet, referred to generally as 10, comprises five plies, namely, an inside ply 11, an outside ply 12 and intermediate plies 13, 14 and 15. These plies consist of a continuous ribbon 50 which in the present illustration is composed of five parallel wires 5, 6, 7, 8 and 9 (shown best in Fig. 8) which lie in the ribbon in the same plane and are covered with a coating of rubber 4 commonly referred to as insulation. The ribbon 50 is formed as illustrated in Fig. 8 by leading the wires from supply reels, not shown, to and through a rubber insulating machine referred to generally as 1, thereby coating the wires with rubber and forming ribbon 50 all as will be understood by those familiar with the art. This rubberized wire ribbon is variously referred to in the tire industry as wire braid, tape or ribbon. In the present application, ribbon will be used to identify the insulated wire.

Figure 3:
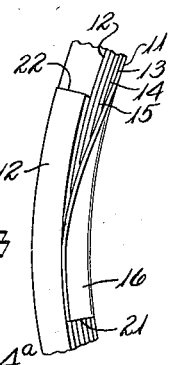
Fig. 3 is a view similar to Fig. 2 but illustrating a modification of the invention.
Figure 5:
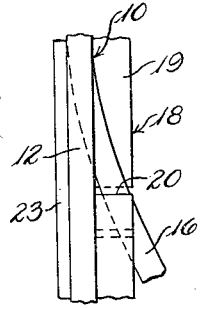
Fig. 5 is a fragmentary top plan view of Fig. 4.
Figure 4:
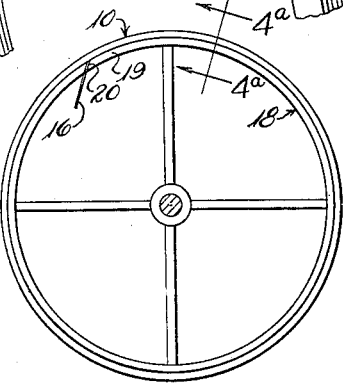
Fig. 4 is a side elevational view of a building ring or form showing a ribbon of insulated bead wire wound thereon as it appears just previous to a radially inner loose end portion of the ribbon being turned over and pressed against the radial outer surface of the other convolutions of the ribbon.
Figure 4A:
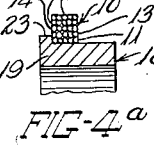
Fig. 4a is an enlarged sectional view taken on line 4—4 of Fig. 4.

The grommet 10 is formed by winding a continuous length of said ribbon upon a building ring 18 as will be seen by reference to Fig. 4. At the winding or plying-up stage of the fabrication of grommet 10 the insulating rubber 4 is unvulcanized and is sufficiently tacky to adhere to itself which permits the handling of the grommet 10 in its unvulcanized state without separations of the convolutions of the ribbon until the grommet is built into a tire. The base portion 19 of building ring 18 is provided with a slot 20. The first step in winding or plying-up said grommet is to insert the beginning end portion 16 of the ribbon which is to be wound upon the form in slot 20 permitting a length of ribbon to extend radially inwardly of said slot to provide a length of ribbon sufficient to be turned angularly radially outwardly across the side over and against the radial outer surface of the finished grommet so that the end 21 of the ribbon will terminate on the outside surface of the grommet. With the end portion 16 of the tape in slot 20, the winding is continuous until, in the present illustration, five plies of the ribbon have been built up and end 21 of the ribbon terminates a distance beyond the end 22 when end 21 is in its final position as shown in Fig. 1. It will be seen by reference to Fig. 4 that building ring 18 is provided with a radial outwardly extending flange 23 against which one edge of said ribbon is brought into contact during said winding operation which results in the edges of the plies or convolutions of the ribbon being wound evenly except for end portions 16. The base 19 of ring 18 is wider than the width of the ribbon so that said slot 20 is spaced axially away from the flange 23 a sufficient distance to offset the portion 16, of the wire that is extended through slot 20, from the main body of the grommet to facilitate the turning of the portion 16 of the ribbon about the body of the grommet as shown in Fig. 2 or Fig. 3. Ribbon end portion 16 may be turned about the grommet body by manually pulling it from slot 20 and turning it about the radial inner corner 24, thence diagonally radially outwardly along the side 25 of the grommet and thence over the radial outer corner 26 and pressing the end 21 against the radially outer surface of ply 12 as best shown in Fig. 2.

Upon completion of the winding of grommet 10, it is removed from building form 18 after which it may be built directly into a tire to form the inextensible member of the tire beads or it may be covered with fabric and have bead flippers attached or given any other treatment found desirable as a matter of tire construction before it is built into the tire.

Figure 6:
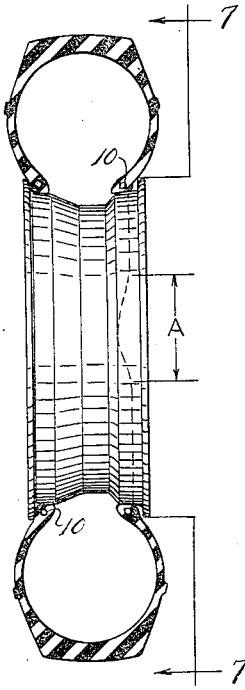
Fig. 6 is a cross-sectional view of a tubeless tire on a rim illustrating the relative position of the bead portion of a tire and the rim when the tire bead is being forced onto the rim bead seat.
Figure 7:
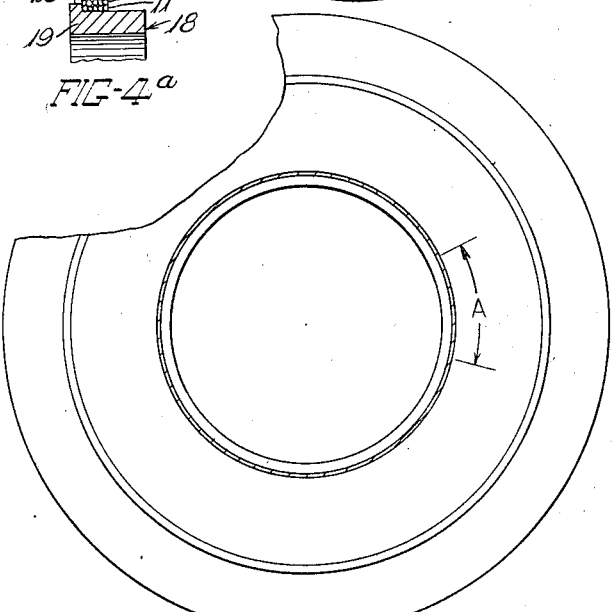
Fig. 7 is a sectional view taken on line 7—7 of Fig. 6.

The present invention finds its most important use during the mounting of passenger tires on drop center rims. As is well known, passenger tires are mounted on drop center rims by first disposing both beads of a tire in the wall of the rim after which the beads are forced to seat upon the rim bead seats. Many expediences are used in this mounting and suitable equipment for this purpose is commercially available. Regardless of the particular equipment used to force the beads to seat on the rim bead seats, the tire beads seldom, if ever, make initial contact with the rim bead seats simultaneously about the inside circumference of the bead. This results in a short length of the inside circumference of the bead being the last to be forced upon the bead seat as will be seen by reference to Figs. 6 and 7. As explained herein above, the inside diameter of the tire bead and the outside diameter of the tire rim bead seats are such that a snug or minus fit of the tire beads on the rim is made. It has been noted that before the present invention that when the wire grommet broke or ruptured in mounting tires that the rupture frequently occurs at the ends of the ribbon that was disposed on the radial inner surface of the grommet. Whatever the explanation may be for breakage or rupture of the grommet at this point it has been observed that this last portion of the tire bead to pass upon its rim seat is drawn radially inwardly forming a short cord of the circle of the tire bead which portion kinks radially outwardly just before it passes on to said bead seat. When the end 21 of ribbon terminated on the radially inner surface of the grommet, as has been a common practice heretofore, and this end fell within the portion of the tire bead that was last to pass upon the rim bead seat breakage frequently resulted, however, if the end of the ribbon on the radial inside of the grommet was not in the last portion of the bead to seat on the rim, no breakage occurred. Since the disposition of the ends of the ribbon cannot be determined when the grommets are built into a tire, whether or not they are at the last portion to seat on the rim bead seat is a matter of chance. Applicant discovered that if he moved the beginning end 21 of the ribbon from the inside surface of the grommet that less wire strength was required.

Applicant prefers the construction of grommet illustrated in Figs. 1 and 2, however, the embodiment of the invention illustrated in Fig. 3 has been found to be a substantial improvement over prior tire bead grommet constructions and this latter does not require complicated machinery to mechanically build the grommet.

The present invention has been illustrated in relation to a five ply grommet and with a splice or lap of the ribbon being approximately six inches long, but it is obvious that the number of plies in the grommet and the number of wires and type of wires in a ribbon may be varied and that various means of turning the beginning end of the ribbon may be devised. Such mentioned changes of construction and modification of methods of building is within the contemplation of the present invention. It is also pointed out that means such as stapling or taping may be used to anchor the end portions of the grommet in position during fabrication of either the grommet or the tire may be used.

What is claimed is:

1. A pneumatic tire bead grommet comprising a plurality of layers of a single ribbon of rubber insulated wire having end portions, said ribbon being wound flat upon itself in several convolutions forming a bundle thereof, said ribbon having one end portion adjoining the first convolution of the ribbon extending from the radial inner surface of said grommet to and lapped over the radial outer surface thereof.

2. A pneumatic tire bead grommet comprising a plurality of layers of a single ribbon of rubber insulated wire wound flat upon itself except at one end thereof, said ribbon having two end portions both of which are disposed entirely on the radial outer surface of said grommet.

3. A pneumatic tire bead grommet of the character described comprising a single ribbon of rubber covered wire, said ribbons having two end portions and being plied up flat into a plurality of layers of several convolutions of the ribbon, a substantial length of one said end portions being disposed on the radial outer side of the grommet and a substantial length of the other end portion being disposed on a lateral side of the grommet.

References Cited in the file of this patent

UNITED STATES PATENTS

| | | |
|---|---|---|
| 1,914,040 | Pierce | June 13, 1933 |
| 2,014,359 | Morrison | Sept. 10, 1935 |